Dec. 24, 1968　　　H. N. WIELAND ET AL　　　3,418,441
STUD-WELDING TOOL
Filed Sept. 10, 1965　　　2 Sheets-Sheet 2
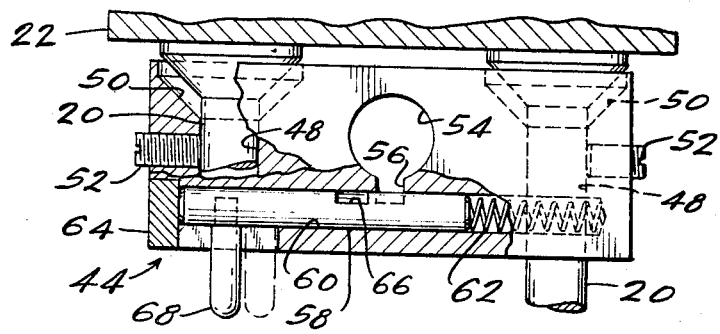
FIG-4-
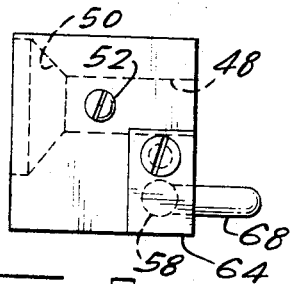
FIG-6-
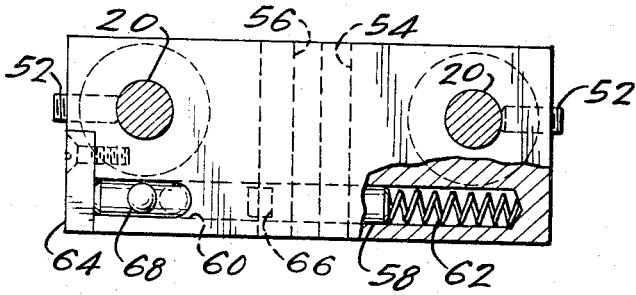
FIG-5-
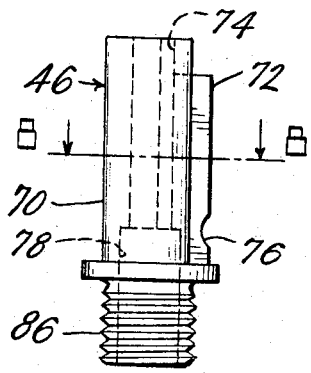
FIG-7-　　FIG-8-
INVENTORS:
H. N. WIELAND,
BY D. E. EHRLICH.
ATT'YS.

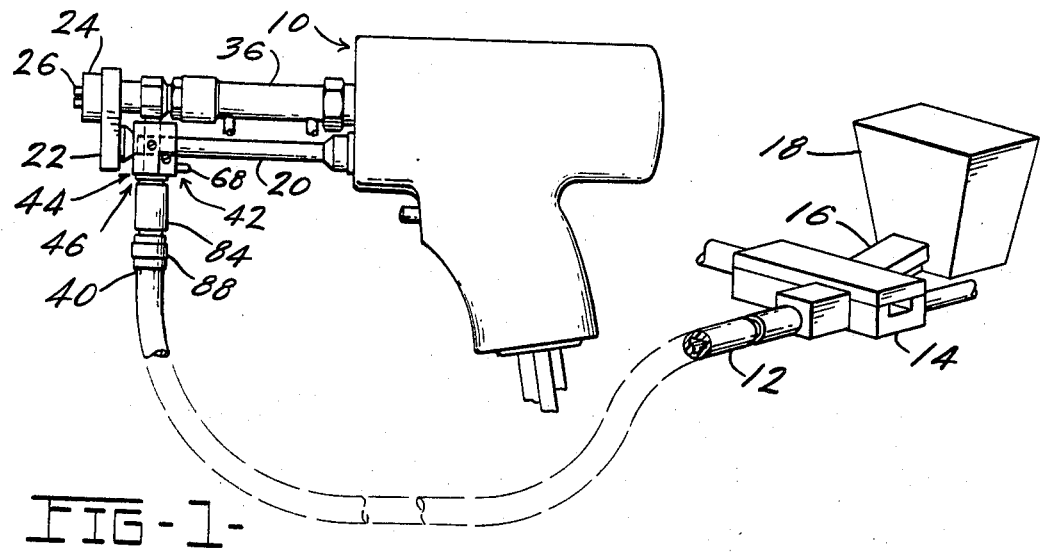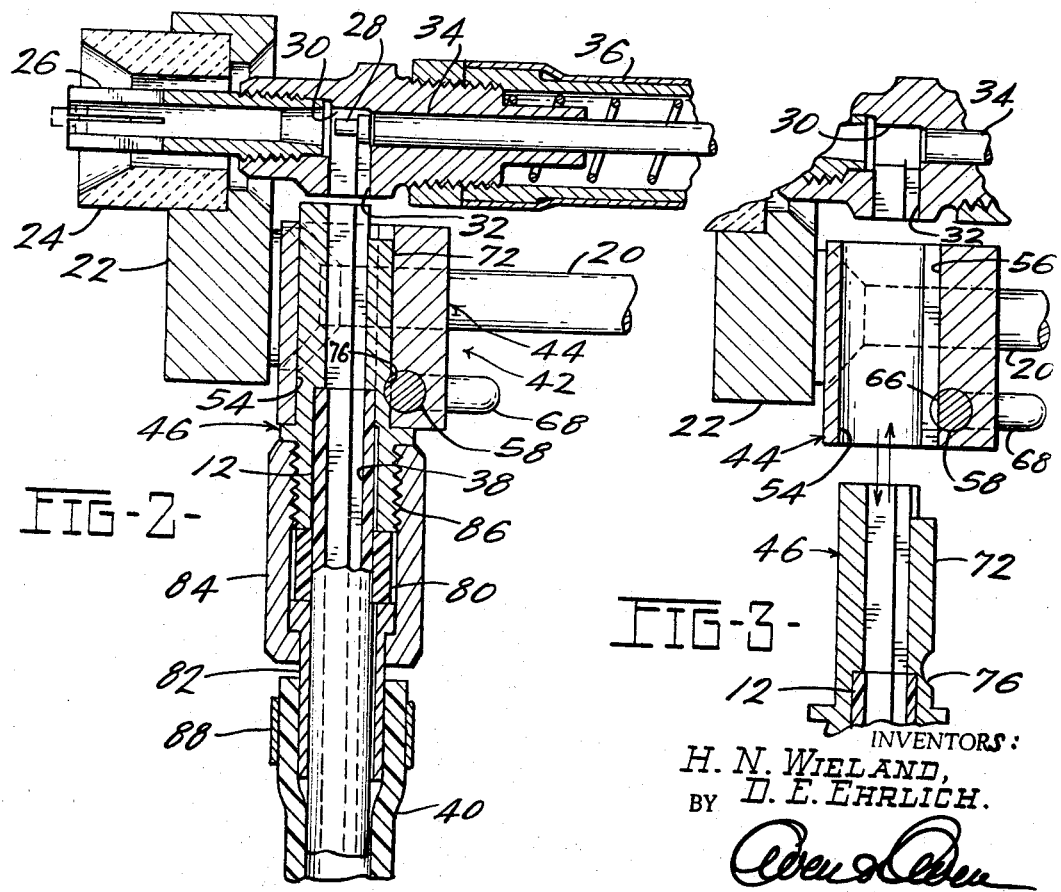

United States Patent Office 3,418,441
Patented Dec. 24, 1968

3,418,441
STUD-WELDING TOOL
Howard N. Wieland, Amherst, and Don E. Ehrlich, Huron, Ohio, assignors to Gregory Industries, Inc., Lorain, Ohio, a corporation of Michigan
Filed Sept. 10, 1965, Ser. No. 486,296
8 Claims. (Cl. 219—98)

This invention relates to apparatus for supplying welding studs to a stud welding tool and more particularly to a connection for a stud supply tube for quickly connecting and disconnecting the tube and the stud welding tool.

Welding tools for arc welding various types of studs in the form of fasteners, etc. to a workpiece are well known in the art. Such tools automatically control the movement of the stud and the arc established between the stud and the workpiece to enable the stud to be rapidly welded to the workpiece, usually in a fraction of a second. Such tools are being used more and more in high production applications where many studs are welded to workpieces on a production line over the period of a day. With these relatively high welding rates, it has become essential that the studs be fed quickly to the welding tool since supplying the studs, properly oriented, to the chuck of the welding tool can require a period of time much longer than that needed for the actual welding. This is especially true for small studs which may be only in the order of one-quarter inch long with a head only one-quarter inch in diameter, as are now used in large quantities for a number of fastening applications.

The size and shape of such studs renders them exceptionally susceptible to jamming when fed automatically to the stud welding tool. A particularly vulnerable portion of the loading system for the studs to jam is a loading chamber located behind the chuck of the stud welding tool. Heretofore, when studs have jammed in this chamber, they have been relatively difficult to free or dislodge primarily because a supply tube which feeds the studs into the chamber has prevented ready access to the jammed stud.

The present invention provides a connection between the supply tube and the welding tool which enables the supply tube to be quickly connected and disconnected to enable easier access to the chamber for the purpose of freeing a jammed stud. The new tube connection also enables the welding tools to be changed or replaced rapidly for purposes of repair or to enable a different style of tool to be used, for example.

The new connection properly aligns the supply passage with the loading chamber and also properly orients the supply passage with the inlet opening of the loading chamber. The supply tube can be disconnected simply by manipulating a releasing means and can be easily reconnected by the same technique.

It is, therefore, a principal object of the invention to provide a connection between a stud supply tube and a welding tool for enabling the tube to be quickly connected or disconnected.

Another object of the invention is to provide apparatus for supplying studs to a stud welding tool and for enabling the apparatus to be disconnected quickly to enable access to a jammed stud.

Other objects and advantages of the invention will be apparent from the following detailed description of a preferred embodiment thereof, reference being made to the accompanying drawing, in which:

FIG. 1 is a somewhat schematic view, partly in elevation and partly in perspective, of a stud welding tool and apparatus for supplying studs sequentially thereto;

FIG. 2 is a greatly enlarged, fragmentary view in vertical cross section of part of the welding tool, supply tube, and a connection therebetween, as shown in FIG. 1;

FIG. 3 is a fragmentary view of a portion of FIG. 2 showing components of the connection in a released or disassembled position;

FIG. 4 is a plan view of a connecting body or block forming part of the tube connection shown in FIGS. 2 and 3, with parts broken away and with parts in section;

FIG. 5 is a rear view in elevation, with parts broken away and with parts in section, of the connecting body of FIG. 4;

FIG. 6 is a left side view of the body of FIG. 5;

FIG. 7 is a view in elevation of a tube fitting constituting an element of the connection along with the body; and FIG. 8 is a view in transverse cross section taken along the line 8—8 of FIG. 7.

Referring particularly to FIG. 1, a welding tool 10 can be of a number of suitable types such as is shown in detail in a co-pending application of Steve Spisak entitled "Apparatus for Welding Studs," Ser. No. 426,274. Studs are supplied to the tool 10 through a flexible supply tube 12 from an escapement 14 to which the studs are fed down an inclined track 16 from a hopper 18.

As also shown in FIG. 2, the tool 10 includes spark-shield supporting means illustrated specifically in the form of a pair of spaced supporting legs 20 and an insulating holder 22 at the front end of the tool with a spark shield 24 received in the holder 22. A chuck 26 holds small welding studs 28 in the position shown in dotted lines during the welding operation, with the studs supplied to a loading chamber 30 through an inlet 32 and moved forwardly by a piston rod 34 powered by an air-operated cylinder 36. The studs are received sequentially in the loading chamber from the flexible supply tube 12, being transported therethrough by air pressure. The tube 12 has a passage 38 therein having a transverse cross-sectional shape equal to the shape of the stud 28 in longitudinal cross section, so that the studs 28 can be supplied sideways through the passage 38. The supply tube 12 also has an outer sheath 40 which serves primarily to protect the tube 12.

The studs 28 occasionally become cocked and jam in the chamber 30 or the inlet 32 primarily because of the fact that the length of the studs is short relative to the head diameter. When the studs become jammed, they are often difficult to free because of limited access to the chamber 30, either through the chuck 26 or the inlet 32. This problem is largely overcome, however, by a quick-release connection 42 embodying the invention provided between the tool 10 and the supply tube 12. The connection 42, as shown, consists basically of two elements, a connecting body or block 44 and a readily-detachable tube fitting 46. The body 44 is supported by the tool and specifically by the spark-shield supporting means or legs 20 near the loading chamber 30. For this purpose, as shown specifically in FIGS. 4 and 5, the body 44 includes two spaced leg passages 48, with enlarged front portions 50, to receive the legs 20 of the tool 10. The body 44 can be attached to the legs by setscrews 52 or other suitable means, when the body 44 is properly aligned with the inlet 32 of the loading chamber 30.

The body 44 also has a fitting passage 54 extending completely therethrough to receive the fitting 46. The passage 54 is generally perpendicular to the leg passages 48 and is located therebetween. In this instance, the passage 54 also includes a groove 56 extending longitudinally thereof to help orient and hold the fitting 46. Other suitable means can be used, however, to orient the fitting 46 relative to the body.

The body 44 also has releasable means for holding the fitting 46. As shown, the releasable means is in the form of a locking pin 58 located in a chamber 60 transversely of the passage 54. The pin has a portion extending into the groove 56 when in a first or locking position against an end wall 64, as viewed in FIG. 4, being urged to this position by a spring 62. The locking pin 58 also has a notch 66 which enables the pin to clear the groove 56 when the pin is moved to a second or release position against the force of the spring 62, by means of a handle 68.

Referring more particularly to FIGS. 7 and 8, the fitting 46 has means to orient the fitting relative to the body and has means engageable with the releasable means of the body. As shown, the fitting 46 includes a generally cylindrical portion 70 which fits closely in the passage 54 of the body and includes a spline 72 which extends into the groove 56 to properly orient a T-shaped passage 74 of the fitting relative to the body. The passage 74 is similar in size and shape to the supply passage 38 and constitutes an extension thereof, from the end of the tube to a point spaced slightly from the inlet 32. The spline 72 has a notch or opening 76 therein through which a portion of the locking pin 58 extends when in the first or left hand position of FIG. 4. Under these conditions, the fitting 46 is held securely in the connecting body 44 and cannot be disassembled until the locking pin 58 is moved to the second position and the notch 66 is aligned with the groove 56 so that the pin clears the groove and spline. As shown, the spline 72 is made separately from the cylinder 70 and is suitably affixed thereby as by brazing or the like.

The fitting 46 has suitable means for making an attachment with the supply tube 12. As shown, the tube 12 is received in a recess 78 of the fitting and has a ring 80 affixed thereto, behind which is a nipple 82. A nut 84 engages threads 86 of the fitting and holds the nipple and ring, along with the tube 12, securely in the fitting 46. The guard tube or sheath 40 is then received on the nipple 82 and held in place by a band 88. The specific supply tube attachment of the fitting 46, however, does not constitute part of the invention.

As will be apparent from the above discussion, the fitting 46 can be quickly attached to the body 44 and released therefrom by simple manipulation of the locking pin 58. The fitting 46 is normally held in the body 44 as shown in FIG. 2 with studs supplied through the tube passage 38, the fitting passage 74, and the opening 32. In the event one of the studs 28 should jam, the locking pin 58 is simply moved to the second position by an operator grasping the handle 68 to align the notch 66 with the groove 56, at which time the fitting 46 is removed from the body 44. The jammed stud can then be removed or properly aligned by access through the passage 54 of the body 44. The passage 54 is much larger than the stud passage 38 in the tube 12 so that easier access is provided to the inlet 32 and the chamber 30 when the fitting 46 is removed.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. In combination, a welding tool having a chuck with a stud-receiving chamber immediately therebehind, a spark shield, and means to support said spark shield around said chuck; a connecting body supported by said spark shield supporting means and having a passage in general alignment with an inlet of said chamber, said body having locking means, a spring engageable with said locking means and urging said locking means to a position in which a portion of said locking means is in said passage, and handle means connected with said locking means and extending from said body to enable said locking means to be moved against the force of the spring to enable said locking means portion to clear said passage; and a rigid fitting extending into said passage, said body and said fitting having non-circular cooperating means for orienting said fitting relative to said body, said fitting having recess means cooperating with said locking means when connected with said body to hold said fitting in said body.

2. In combination, a portable stud welding tool having a chuck with a fastener-receiving chamber therebehind, means for connecting said chuck in circuit with a source of power and a workpiece, a connecting body having a passage therethrough, means carried by said tool for supporting said connecting body with said passage in general alignment with an inlet of said chamber, said body having locking means positioned transversely of said passage, a spring engageable with said locking means and urging said locking means to a position in which a portion of said locking means is in said passage, and handle means connected with said locking means and extending away from said body to enable said locking means to be moved against the force of the spring to enable said locking means portion to clear said passage, and a rigid fitting extending into said passage, said fitting having recess means cooperating with said locking means when connected with said body to securely hold said fitting in said body.

3. The combination according to claim 1 wherein said inlet is shaped to receive a headed stud, and said fitting has a passage of substantially the same cross-sectional shape as said inlet and aligned therewith by said orienting means.

4. The combination according to claim 2 characterized by said fitting has a passage shaped to receive headed studs, and said body and said fitting have non-circular cooperating means for orienting said fitting relative to said body with the passage of said fitting oriented in predetermined relationship with said inlet.

5. The combination according to claim 1 wherein said rigid fitting is held by said body spaced from said chuck.

6. The combination according to claim 2 wherein said rigid fitting is held by said body spaced from said chuck.

7. The combination according to claim 4 characterized by said cooperating means for orienting said fitting relative to said body comprises a groove in said body passage and a ridge on said fitting for extending into said groove.

8. The combination according to claim 7 characterized by said recess means of said fitting is located on said ridge, and said locking means extends at least partly through said groove at a position corresponding to said recess means on said ridge.

References Cited

UNITED STATES PATENTS

| | | | |
|---|---|---|---|
| 2,416,954 | 3/1947 | Remmey | 219—98 |
| 2,506,286 | 5/1950 | Wittlin | 285—305 X |
| 2,537,989 | 1/1951 | Graham | 219—78 |
| 2,772,898 | 12/1956 | Seeler | 285—305 X |
| 2,905,803 | 9/1959 | Brady | 219—79 |
| 3,045,105 | 7/1962 | Atwood | 219—98 |

RICHARD M. WOOD, *Primary Examiner.*

R. F. STAUBLY, *Assistant Examiner.*

U.S. Cl. X.R.

285—305